June 28, 1960　　　　H. S. WEINTRAUB　　　　2,942,356
STRUCTURAL MOLECULAR MODELS
Filed June 12, 1957　　　　　　　　　　　　　2 Sheets-Sheet 1
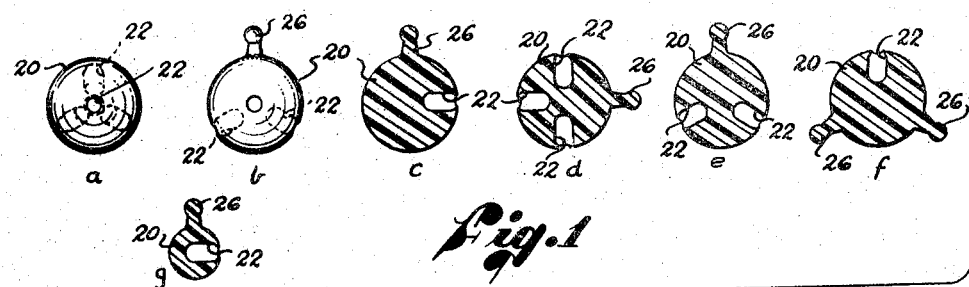
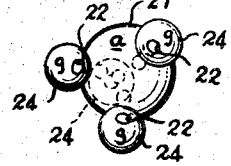
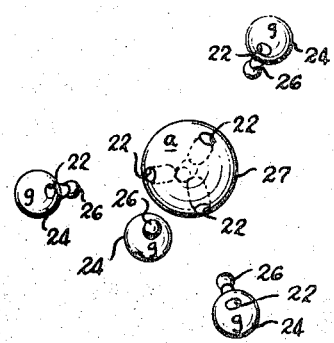
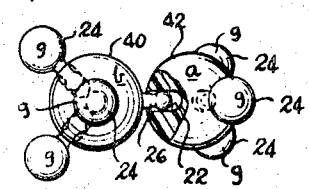
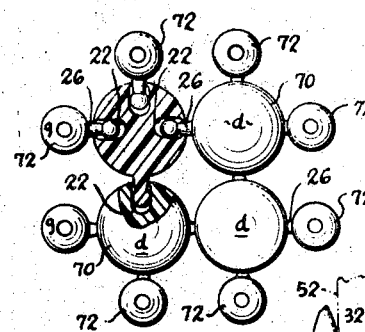
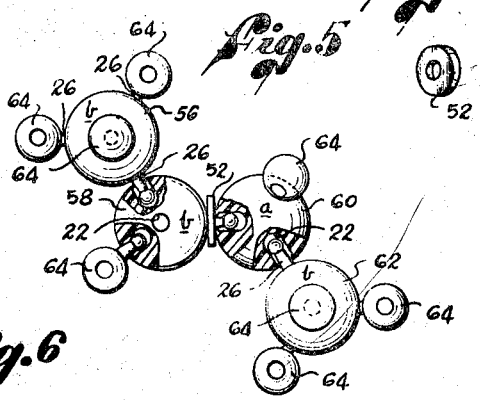
INVENTOR.
HERBERT S. WEINTRAUB
BY *Fulwider Mattingly & Huntley*
Attorneys

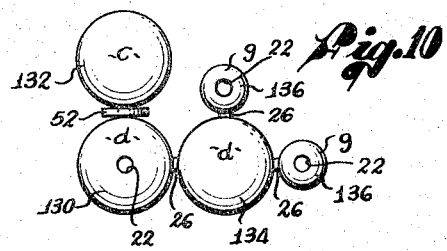
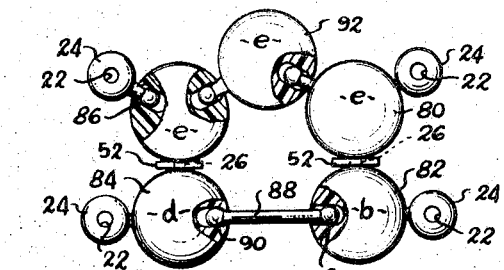
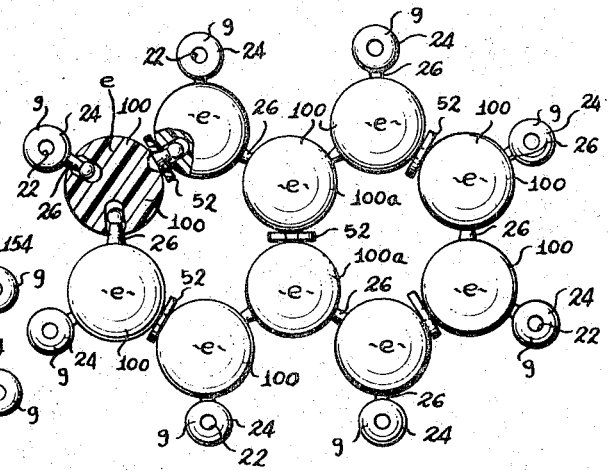
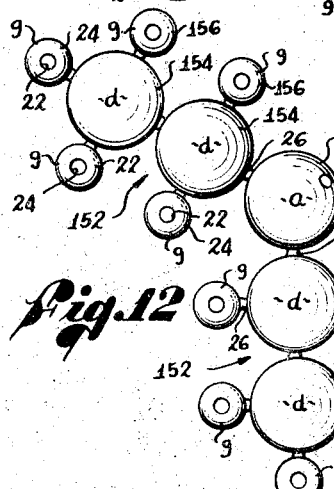
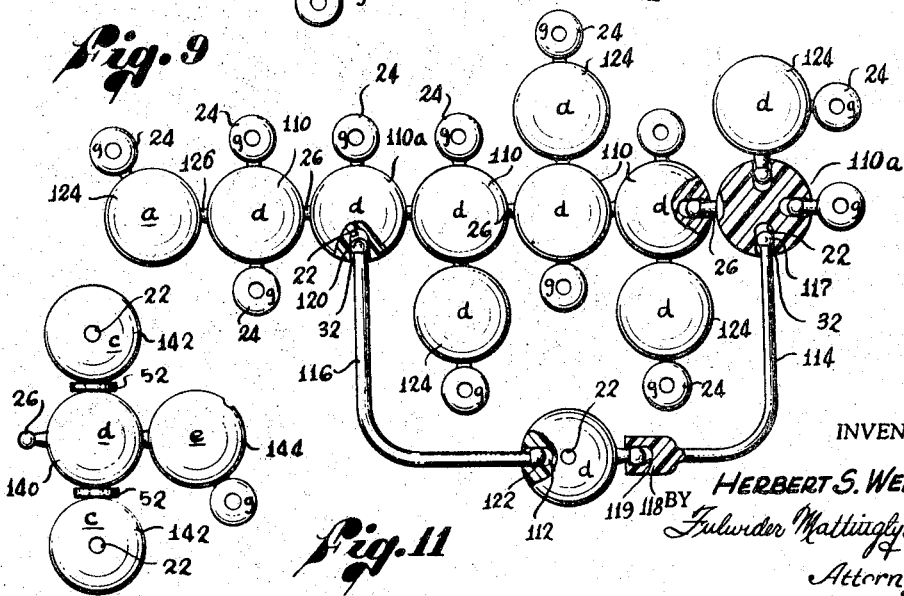
INVENTOR.
HERBERT S. WEINTRAUB
BY Fulwider Mattingly & Huntley
Attorneys

United States Patent Office

2,942,356
Patented June 28, 1960

2,942,356

STRUCTURAL MOLECULAR MODELS

Herbert S. Weintraub, Culver City, Calif., assignor to The A. C. Gilbert Company, New Haven, Conn., a corporation of Maryland Filed June 12, 1957, Ser. No. 665,230

9 Claims. (Cl. 35—18)

This invention relates generally to the construction of structural models of chemical molecules and relates especially to the construction of three-dimensional displays of organic chemical molecular models.

In the past, models of chemical molecules have generally been constructed on a Tinker-Toy principle, that is, the covalent bond that is shared between two atoms of a molecule is affixed to one of the atoms and press-fitted into an appropriately sized hole in the other atom. Such means for joining two atoms of a molecular model is, however, not satisfactory, inasmuch as the valence bonds or rods and the complementary holes must be accurately machined, thus raising the cost of their construction to a point where students of chemistry for whose use they are primarily intended generally cannot afford them.

Another disadvantage of conventional molecular models is that the representation of double and triple bond linkages between adjacent atoms, as for example, in ethylene or acetylene, requires a plurality of adjacent holes and valence rods which become unduly complex and costly. A further disadvantage of conventional molecular models is that the great variety of organic chemical compounds cannot be readily constructed with but several modular beads, thus further increasing the cost of manufacture of a complete kit.

Bearing in mind the foregoing facts, it is a major object of the present invention to provide relatively few modular beads for the representation of a plurality of atoms whereby substantially all organic chemical compounds may be constructed in a simple and convenient manner.

Another object of the present invention is to provide a modular bead for the construction of molecular models which can be readily and inexpensively fabricated, the modular bead having one or more valence bonds and one or more bond receptacles, said bonds and said receptacles being of approximately the same size but not requiring accurate and close tolerances in their construction.

Still another object of the present invention is to provide a plurality of modular beads enabling organic chemical compounds to be made approximately in accordance with the concepts of conventional stereochemistry.

It is yet another object of the present invention to provide a chemical molecular model in which any two atoms of the molecular model are linked by means of a bond affixed to one of the atom modules and retained within the other of the atom modules without slippage during normal usage while being readily broken under slight pressure.

A further object of the present invention is to provide a chemical molecular model wherein the means for representing double and triple bonds is simple and inexpensive.

These and other objects of the present invention will become clearly understood with reference to the following description, and to the accompanying drawings, in which:

Figure 1 shows the modular beads of my invention, the beads $a$ and $b$ being shown in elevation, the remaining beads being shown in axial cross-section;

Figure 2 is an elevational view of a chemical compound employing two of the modules of Figure 1;

Figure 3 is an exploded view of the chemical compound shown in Figure 2;

Figure 3a is an enlarged view of a typical atom linkage showing a valence bond inserted within a receptacle of its linked atom.

Figure 4 is a partially cut-away elevational view of another chemical compound employing another of the modules shown in Figure 1;

Figure 5 is a partially cut-away elevational view of another chemical molecular model employing some of the modules shown in Figure 1 and showing the method of double covalent bonding;

Figure 5a is a perspective view of an insert for the alkyne series of chemical compounds;

Figures 6, 7, 8 and 9 are partially cut-away elevational views of various classes of compounds employing the modules shown in Figure 1;

Figures 10 and 11 are plan views of functional groups employing the modules of my invention; and Figure 12 is an elevational view of another class of chemical compounds employing the modules of my invention.

Referring now to Figure 1, the basic modules, or modular beads, by means of which the great majority of organic chemical compounds may be formed are shown. Each of the modular beads $a$ through $f$ comprises a preferably spherical body 20 and is provided with either a valence receptacle 22 formed therein or a valence bond 26 affixed to the surface of the body, or provided with both. The valence bonds or linkage means, and the bond receptacles, are arranged on the body 20 of each modular bead in varying spatial relationships so as to obtain the great variety of chemical compounds desired. Further, each of the modules $a$ through $f$ is provided in a series of colors so that each modular bead can represent a variety of atoms.

Referring now especially to Figures 2 and 3, the use of modules $a$ and $g$ is illustrated in the methane module $CH_4$. The module $a$ is employed as the carbon atom 27 and has four bond receptacles 22 each spaced approximately 120 degrees apart from the other. The hydrogen atoms 24 are depicted by the small module $g$, the hydrogen modules having a single valence bond or linkage 26 protruding from the body 20. The carbon module $a$ is colored black and the hydrogen module $g$ is colored red to readily distinguish the atoms.

The valence bond 26 of module $g$ is adapted to be mounted into the bond receptacles 22 of module $a$, and in this manner, a regular tetrahedral structure of the methane molecule is simulated in three-dimensional form. It will be noted that if the four valence receptacles 22 of the carbon atoms 27 are directed exactly towards the corners of a regular tetrahedron, the angle between any two receptacles 22 would be 109°28'. However, the angle of approximately 120 degrees is employed so that the benzene napthalene and other ring structures requiring a 120 degree spacing may be readily formed, employing the same module as will be seen hereafter.

Any of the valence bonds 26 of the modules $a$ can removably be inserted within the receptacle cavity of a carbon module 20 or 27, as best shown with reference to Figure 3a. The bond 26 is preferably integrally affixed to the hydrogen module 24 and extends radially therefrom, the bond 26 comprising a tapered neck or rod 28 terminating in an enlarged rounded head, or bulb 30. Bond 26 slidably engages the side walls of the chamber or receptacle cavity 22 of module a which is cylindrical in shape and therefore of uniform width and has an inner concave end 22a. The valence bond 26 is retained within the receptacle by an annular retaining ring or mouth 32 preferably integrally formed with the carbon module 20 or 27, the mouth being of slightly narrower inner cross-section than the largest cross-section of the head 30 of the valence bond. The mouth 32 is made of a slightly resilient deformable plastic material, for example, polyethylene, whereby it is deformed radially outwardly upon insertion of the head 30 of the bond 26 within the cylindrical chamber 22. The head 30 fits slidably within the receptacle 22 and the retaining ring 32 holds the valence bond 26 so that, during normal handling of the molecule, disengaging movement of the atom molecule is prevented. However, upon slight pressure exerted between the atom modules 20, 27 and 24, the bond 26 is readily severed.

The joined atom modules 24 and 27 are rotatable with respect to each other about the bond axis, this rotatability having certain advantages in illustrating cis-trans configurations and other stereoisomeric phenomena and other complex molecules, as will be seen.

The bond 26 is also preferably an extension of the same slightly resilient and flexible plastic material of the body, such as polyethylene, thus enabling the covalent bond itself to be somewhat flexible when disengaged from its receptacle cavity. Further, the atom molecules 27, 24, when joined, are relatively pivotable within a limited range about the axis of the bond, due to the resilient yielding of the mouth 32 of the module permitted by the inherent resiliency of these members. The limited pivotal rotatability about the axis of the bond aids in effecting combination of a plurality of atom modules, especially those to be combined in angular or ring structures.

For economy and ease in manufacture, the modules a through f, as well as the retaining ring 32 and the bond neck 28, are preferably molded from a slightly resilient plastic material such as polyethylene.

It will thus be seen that the means for illustrating in three dimensions a single covalent bond between any two atoms in the molecule is readily obtained, and, further, that such means enables ready assembly and disassembly of the atoms or modules while allowing the bond to be stably mounted without tilting out of coaxial alignment with the receptacle cavity during normal handling because of the hugging engagement of the stem of the bond by the cavity mouth at a point in the length of the bond substantially spaced from the point of engagement of the bond head with the cavity wall. In addition, the flexibility and rotatability of the bond enables ready positioning and combination of atoms.

It will be noted that receptacles 22 of the red hydrogen modules g in Figures 2 and 3 are unoccupied. However, the clarity of the three-dimensional display is not diminished by the visualization of these unoccupied openings.

Referring now to Figure 4, ethane, the next higher homolog of methane, is shown, which illustrates the use of the module b. The carbon module atoms numbered 40 and 42 are represented by black modules a and b, respectively, while red modules g represent the hydrogen atoms 24, as described in Figures 2 and 3. It is to be noted that the module b is necessary to illustrate ethane, inasmuch as the linkage between carbon modules a and b is supplied only by module b. The valence bonds 26 of modules b and g slidably and rotably fit within their respective receptacles 22, described previously with reference to Figure 3a.

In constructing models of the entire alkyne series, each additional carbon atom for each homolog is represented by the addition of another black module of the b type.

The means for illustrating the presence of saturated compounds in which either a double or a triple bond is present, is shown by way of example in Figure 5. A non-planar model of butylene is here illustrated, the black carbon atoms being designated by numerals 56, 58, 60 and 62, and being joined together by a succession of valence bond-valence receptacle relationships, as described with reference to Figure 3a. The carbon atoms which are connected by double covalent bonds are represented by an annular collar 52 which is adapted to stably fit onto the tapered rod 58 of the valence bond 26. The collar 52 is constructed of a resiliently deformable plastic material, for example, polyethylene, and has an inner diameter slightly smaller than the largest diameter of the head 30 of the valence bond 26. As best shown in Figure 3a, the collar 52 (in dotted line) is positioned on the rod 28 between the module 24 and the head 30 affixed thereto. This is accomplished by forcing the collar 52 over the head 30. The collar 52 is preferably colored, for example, silver, to designate that it represents a double bond.

Where illustration of the molecules in the alkyne series is desired, the collar 52, shown in Fig. 3a, is similarly positioned between the appropriate pair of black carbon modules, but is distinguished from the double bond collar by its color. For example, the color of the triple bond collar 52 can be gold. It can thus be seen that the method for providing for the illustration of double and triple bonds is exceedingly simple in comparison with the conventional means which requires substantially greater amounts of material and requires skilled labor for their production.

It will be noted that the two central carbon atoms 58 and 60 in Figure 5 each has one receptacle 22 unoccupied, inasmuch as the four valences of each of these carbon atoms are utilized by three bonds and/or receptacles. However, the clarity of the three-dimensional display is not diminished by seeing the unoccupied receptacles 22.

The trans form of butylene is shown in Figure 5; however, by merely rotating either carbon atom 58 or carbon atom 60, 180 degrees about the double bond axis, the cis form is readily constructed.

Referring now to Figure 6, the planar configuration of another class of compounds, the alicyclic compounds, is shown by way of the example cyclobutane $C_4H_8$. The carbon atoms are designated by the numeral 70, and are all represented by the black module d, while the hydrogen atoms 72 are represented by the red module g. The method of joining the carbon atoms 70 to each other and to the hydrogen modules 72 is similar to that previously described with reference to Figure 3a.

The heterocyclic group of chemical compounds is represented by furan $C_4H_4O$, shown in Figure 7. The furan model is shown as a planar molecule, the carbon atoms 80, 82, 84 and 86 being represented by black modules e, b, d, and e, respectively. The carbon atom pairs 80—82 and 84—86 are joined in the usual manner by means of a bond 26 rotatably and pivotally mounted within the receptacle 22 of the adjacent carbon atom, and silver collars 52 are mounted on these bonds 26 in the manner previously described, thereby denoting double bond linkages. The carbon pair 82—84 are joined by a bridging bond 88 having spherically rounded ends 90, identical to heads 30 of bond 26, the ends 90 being inserted within the receptacles 22 of modules b and d, as shown in Fig. 7 in the usual manner.

Carbon atoms 80 and 86 are removably affixed to an oxygen atom 92, represented by the module e, having a color different from that of the black carbon module— for example, white. The valence bond 26 and the bond receptacle 22 of module e are in the same plane and are spaced approximately 120 degrees apart, the angular relationship between the joined carbon modules 80 and 86 and the oxygen atom module 92 thus being approximately 120 degrees.

The hydrogen atoms 24 in the furan model are represented by module g and their valence bonds 26 are inserted into the appropriate receptacles 22 of carbon atoms 80, 82, 84 and 86, as indicated. The bond receptacle 22 remaining in the hydrogen module 24 is unoccupied, and again this does not detract from the clarity of the three-dimensional display.

Alternatively, black modules f can replace the modules e (representing the carbon atoms 80 and 86), in which case the carbon atoms 82 and 84 would be represented by modules a instead of b. This representation is not completely planar, since the hydrogen atom module g attached to the module a would not all lie in the same plane. The angular valences of module f also represent the carbon atom where at least one double bond linkage is required to be attached to the carbon, as, for example, in representing carbon dioxide.

Referring now to Figure 8, a naphthalene molecule is shown as an example of the aromatic compounds that may be constructed employing the modules of my invention. Each of the carbon atoms 100, 100a of the model lies in the same plane, and is represented by the black module e. Carbon atoms 100a, which are the bridging atoms joining the two rings, have their bond receptacles 22 occupied by the bond 26 of adjacent carbon atom modules. The remaining carbon atoms 100 have a single bond receptacle 22 occupied by the valence bond 26 of a number of hydrogen atoms 24 represented by the red module g.

The silver double bond collars 52 are alternately spaced throughout the rings in the naphthalene molecule as required by conventional theory and are affixed to the valence bond 26 in the usual manner, as previously described in Figure 3a.

It will be seen that by removing four of the carbon atoms 100 which are provided at the right or the left of the bridging atoms 100a, a benzene ring is formed. Conversely, additional rings may be added to the benzene or naphthalene configurations to thereby form a multitude of ring compounds such as the three-ringed anthracene, the additional rings being composed of joined carbon atom modules of the e type and having collars 52 and hydrogen modules g affixed thereto in appropriate positions on the valence bonds 26, as required by theory.

In the glucoside class of chemical compounds, the ethereal oxygen atom linkages are linked to carbon atoms which are spaced a substantial distance from each other, molecularly speaking. For this reason, the usual valence bond 26-bond receptacle 22 linkage is modified, the modified linkage being shown, by way of example, in beta dextra glucose in Figure 9.

The molecular module of glucose is shown comprising a series of carbon atom modules 110, 110a lying in a straight chain, each carbon atom being represented by a black module of the d type, and the ethereal oxygen atom 112 being represented by a white module d and affixed to spaced carbon atoms 110a. Carbon atoms 110, 110a are affixed to each other in the manner previously described, whereas the ethereal oxygen atom 112 is affixed to the carbon atoms 110a by means of a pair of right angle bridges 114 and 116, respectively. Bridge 114 has a rounded end 117 slidably enclosed within receptacle 22 of the outside carbon atom 110a, the rounded end being enclosed by the narrow mouth 32 of receptacle 22, as described previously. The bridge 114 also has an open end 118 which defines a receptacle 119 of substantially the same construction as receptacle 22, so as to slidably enclose the valence bond 26 of the oxygen atom 112. Bridge 116 has rounded ends 120, 122 which are slidably enclosed within receptacles 22 of the remaining carbon atom 110a and the oxygen module 112.

The five functional hydroxyl groups in the glucose molecule are affixed to carbon atoms 110, 110a as follows: the functional hydroxyl group is first made by inserting the valence bond 26 of red hydrogen module g, designated by the numeral 24, into the receptacle 22 of an oxygen atom 124 represented by a white module d. The valence bond 26 of the hydroxyl group, which is affixed to the white oxygen atom, is then inserted into the single receptacle 22 left in the carbon atoms 110, 110a.

Hydrogen atoms 24 are then inserted in the remaining receptacles of the carbon atoms to complete the molecular model.

If a functional group is desired to be attached at a point along a chain compound, or at any point in a ring compound, the hydrogen module is replaced by the functional group desired, in a manner similar to the attachment of the functional group in the glucose compound.

A further illustration of functional groups that are readily constructed using the modules of my invention are the amide group $CONH_2$, shown in Figure 10, and the sulfonate group —$SO_3H$, shown in Figure 11.

Referring especially to Figure 10, the carbon atom 130 is represented by the black module d, the oxygen atom 132 represented by the white module b, c, d, or e, but preferably by module c, the nitrogen atom 134 by a blue module d, and the hydrogen atoms 136 by the red module g. All of the atoms in the functional group are joined in the usual manner, the carbon-oxygen linkage being represented by a double bond as indicated by the silver collar 52. It will be noted that the carbon atom 130 of the group has an available bond receptacle 22 to thereby receive the valence bond 26 of an incomplete molecule.

Referring now especially to Figure 11, the sulfonate radical $SO_3H$ is shown. The sulphur atom 140 is represented by a yellow module d; the oxygen atoms 142, doubly bonded to the sulphur atom, employ a white module c; the remaining oxygen atom 144 of the hydroxy group is represented by the white module e, and the hydrogen atom 24 is represented by the red module g.

The atoms 140, 142, and 144 are linked in the usual manner, and the double linkages are represented by the silver collar 52. The protruding valence bond 26 is adapted to connect the functional group to an incomplete molecule.

The great variety of organic halide compounds is represented by providing the module g with a variety of colors. For example, the chlorine, bromine, iodine, and fluorine atom modules are colored green, brown, violet and orange, respectively. Thus, the substitution of two chlorine atoms in the methane molecule (Figures 2 and 3) results in a black carbon atom module 27, a pair of red hydrogen atom modules, and two green chlorine atom modules. The presence of the substituted halides is thus immediately seen, and these can be readily interchanged with hydrogen or other functional groups, inasmuch as all the atom modules are interchangeable.

The organo-metallic compounds are represented by the molecular example $M(C_2H_5)_2$, as shown in Figure 12. The metal atom M150 employs any of the modules a through e, depending upon the particular metal to be shown. The metal modules generally used are a, b, c and d, and are colored gray, and are of the same size as carbon module d. Referring specifically to Figure 12, the two ethyl radicals 152 employing carbon and hydrogen atoms 154 and 156, respectively, are connected in the usual manner and are affixed to receptacle 22 of the metal module a by means of the valence bonds 26 of carbon atoms adjacent thereto.

It can be seen from the foregoing that in order to construct a wide variety of chemical compounds, a set of modules must be provided, each type of module having a variety of different colors to represent different atoms. As a typical example, the module types are colored as set forth below:

| Module | Colors | Representing Atoms |
| --- | --- | --- |
| a | White, gray, black | O, M, C. |
| b | Blue, Yellow, Black | N, S, C. |
| c | White, Gray, Black | O, M, C. |
| d | White, Yellow, Gray, Black | O, S, M, C. |
| e | White, Blue, Yellow, Black | O, $N_2$, S, C. |
| f | ....do | O, N, S, C. |
| g | Red, Green, Brown, Violet, Orange, Black. | H, C, Br, I, F, C. |

The set would further include the silver and gold colors 52 denoting the double and triple bonds, respectively, and would further include straight bridging bonds 80, as shown in Figure 7, and angled bridging bonds 114, 116, as shown in Figure 9.

It is possible, with some sacrifice in the accuracy of stereochemical relationships, to employ a lesser number of modules than the seven shown and described above. For example, modules a, d, and g are employed to represent various atoms and would appear in a variety of colors. Module a is employed to represent carbon, oxygen, nitrogen, sulphur, and a metal, and would appear in the colors black, white, blue, yellow and gray, respectively. Module g would represent hydrogen, chlorine, bromine, iodine, and fluorine, and would appear in the colors red, green, brown, violet, and orange, respectively. Module d would be employed to represent carbon, oxygen, nitrogen, sulphur, and metal in its planar configuration, and would appear in the colors black, white, blue, yellow and green, respectively.

The module d itself can be used as the basis for constructing a wide variety of compounds. For example, it can be employed in the colors black, white, blue, yellow and green to represent carbon, oxygen, nitrogen, sulphur and the metals, and can be employed in a smaller size, of the order of module g, to represent hydrogen and the halides. All chain and ring compounds can be constructed employing this single module d, its chief limitation being, however, that only non-planar compounds can be formed. Similarly, where stereochemical relationships are not of prime importance, such sets of modules are highy advantageous as educational units, especially for beginning students in chemistry.

While I have described in some detail several embodiments of my invention, it will be apparent that substantial changes and modifications may be made that lie within the scope of my invention. However, I do not intend to be limited by the embodiments shown and described herein, but only by the appended claims.

I claim:

1. A molecular model of a chemical compound comprising a first module whose body material is extended to form a projecting valence bond having an elongate neck stemming from the external surface of said module and a head wider than said neck spaced from said module surface along the axis of said neck forming the terminal of said bond, and a second module of synthetic plastic material having the approximate resilient properties of polyethylene containing an elongate open receptacle cavity whose width crosswise of its longitudinal axis is uniform and as small as the width of said head of said bond, said cavity having a concentric mouth defined by said plastic material as narrow as said bond neck at the external surface of said second module constantly in hugging engagement with said bond neck, whereby said mouth permits but resiliently opposes the passing of said bond head therethrough and constantly biases said bond and said cavity into coaxial alignment thereby to oppose relative wobbling of said modules when connected by said bond.

2. A molecular model as defined in claim 1, in which the said bond head is bulbous and the said external surface of the said second module has a spherical shape extending to the point of hugging engagement of said cavity mouth by said bond neck.

3. A molecular model as defined in claim 2, in which the said bond has engagement laterally with the cavity structure restraining it against tipping in any direction relatively to the said second module simultaneously at two points substantially spaced apart axially of said bond, one of said points being at the maximum girth of the said bulbous bond head and the other of said points being spaced from said head in the length of the said bond neck.

4. A molecular model as defined in claim 3, in which the said bond neck tapers from a relatively large girth at the said external surface of the said first module to a relatively small girth at its junction with the said bond head, whereby the hugging of said bond neck by the said cavity mouth becomes tighter as said bond head is forced farther into the said receptacle cavity.

5. In a set of resiliently deformable plastic modular beads for constructing models of organic chemical compounds, at least one bead having a receptacle formed therein and having a valence bond integrally affixed to said bead of shape and size to be removably and pivotally mounted within a like receptacle in another bead of said set, said receptacle being substantially circular in cross-section in its inner section, and narrower in cross-section at its mouth, and said valence bond having a neck terminating in a rounded head of cross-section substantially equal to the cross-section of said inner section of said receptacle but larger in cross-section than the mouth of said receptacle whereby said bond, upon being forcibly inserted past the mouth of said like receptacle in another bead is rotatably and pivotally mounted removably therein.

6. A plurality of types of colored modular beads which includes: a first modular bead type having at least one integral valence bond and one valence receptacle spaced approximately 120 degrees from each other; and a second modular bead type having at least one integral valence bond and one valence receptacle spaced approximately 90 degrees apart and in the same plane, said valence bonds each having an enlarged rounded head and said valence receptacles each having a diameter substantially equal to the diameter of said head and having a resilient ring of smaller inner diameter integrally affixed to the mouth of said receptacle whereby to retain said head of said valence bond within said valence receptacle to connect together the two modular types.

7. A plurality of modular bead types for the construction of models of organic chemical compounds which includes: a first bead type having tetrahedral spaced valence receptacles formed therein; a second modular bead type having at least one valence bond affixed thereto and a plurality of tetrahedral spaced valence receptacles; a third modular bead type having at least one valence bond affixed thereto and one valence receptacle spaced 90 degrees from said valence bond, each of said valence bonds of said bead types having a tapering rod terminating in a rounded head, each of said valence receptacles of said bead types having a narrow resilient annular ring formed on the mouth of said receptacle, the rounded heads of said bonds being forcibly insertable past said ring on the mouth of said receptacle to be slidably and rotatably enclosed within said receptacle during normal handling; and means for representing double and triple bonds, said means being affixed to said valence bonds.

8. A set of modular bead types according to claim 7, wherein said means for illustrating double and triple bonds comprises a series of differently colored annular rings composed of resiliently deformable material, said rings being of slightly smaller inner diameter than the diameter of said rounded head of said valence bond, and said ring upon being forcibly inserted over said rounded head being thereby retained on said valence bond.

9. A plurality of modular bead types according to claim 7, which includes elongated bridging bonds having an enlarged head for insertion within a receptacle.

References Cited in the file of this patent

UNITED STATES PATENTS

| | | |
|---|---|---|
| 1,971,545 | Tompkins | Aug. 28, 1934 |
| 2,052,457 | French | Aug. 25, 1936 |
| 2,308,402 | Taylor | Jan. 12, 1943 |
| 2,714,269 | Charles | Aug. 2, 1955 |

FOREIGN PATENTS

| | | |
|---|---|---|
| 1,101,229 | France | Oct. 4, 1955 |

OTHER REFERENCES

Chicago Apparatus Co., Catalog No. 55, page 682, copyrighted 1954, Q/185/C53, catalog in Div. 47. Article: "Master Crystal Models."